United States Patent [19]

Chamberlin

[11] 4,011,899
[45] Mar. 15, 1977

[54] STEEL MEMBER FOR REINFORCING RUBBER COMPOSITIONS AND METHOD OF MAKING SAME

[75] Inventor: John M. Chamberlin, St. Louis, Mo.
[73] Assignee: Monsanto Company, St. Louis, Mo.
[22] Filed: Apr. 27, 1976
[21] Appl. No.: 678,485

Related U.S. Application Data

[63] Continuation of Ser. No. 551,224, Feb. 19, 1975, abandoned.

[52] U.S. Cl. .......................... 152/361 R; 152/356; 152/359; 148/16.5; 148/36
[51] Int. Cl.² ...................... B60C 9/18; B60C 9/16
[58] Field of Search .......... 152/354, 355, 356, 357, 152/361 R, 361 DM; 148/12 F, 16.5, 36

[56] References Cited

UNITED STATES PATENTS

| 3,083,749 | 4/1963 | Destinay et al. ............... 152/361 R |
| 3,667,529 | 6/1972 | Mirtain ...................... 152/361 DM |
| 3,794,097 | 2/1974 | Kind ............................. 152/361 R |
| 3,953,250 | 4/1976 | Golland et al. ..................... 148/36 |

FOREIGN PATENTS OR APPLICATIONS

| 787,985 | 12/1972 | Belgium ............................ 152/354 |
| 2,173,628 | 10/1973 | France ............................. 152/354 |

Primary Examiner—Drayton E. Hoffman
Attorney, Agent, or Firm—James W. Williams, Jr.

[57] ABSTRACT

A steel member, essentially rectangular in cross-section, having an aspect ratio greater than 2 having an adhesive coating on the surface thereof, wherein the reinforcing member is characterized by a tensile strength greater than 200 ksi and a microstructure of tempered martensite, bainite and mixtures thereof.

A method is disclosed for making a steel member comprising the steps of slitting in coil form steel stock containing more than about 0.40% carbon, continuously heat treating the stock so as to obtain a microstructure of tempered martensite, bainite or mixtures thereof and then applying an adhesive coating to the stock.

7 Claims, 3 Drawing Figures

STEEL MEMBER FOR REINFORCING RUBBER COMPOSITIONS AND METHOD OF MAKING SAME

This is a continuation of application Ser. No. 551,224, filed Feb. 19, 1975, now abandoned.

BACKGROUND OF THE INVENTION

1. Field of the Invention

This invention relates to reinforcing members suitable for use in rubber composite structures and more particularly to a steel ribbon containing an adhesive coating on the surface thereof and characterized by specific mechanical and metallurgical properties.

2. Description of the Prior Art

The use of steel in various geometric configurations for reinforcing rubber articles is well known. Thus U.S. Pat. No. 3,762,145 discloses metallic filaments twisted together to form a strand. A plurality of these strands are then twisted together thereby forming a cord. Such a technique is well accepted for producing reinforcing members for rubber articles and particularly pneumatic tires. Forming such cords, however, is expensive because of the equipment required and the numerous processing steps involved. Costs are further increased because of low product yields attributed to filament breaks, cord abrasion and other mechanical damage to the cord caused by twisting or stranding. Fatigue resistance is an important property of such reinforcing members and any surface defects which are generally attributed to twisting or stranding may be cause for rejection.

Another technique for reinforcing pneumatic tires is to use reinforcing elements in the form of thin flat strips. Such elements are disclosed in recently issued U.S. Pat. Nos. 3,667,529, 3,794,097 and others dating back to the nineteenth century. In U.S. Pat. No. 3,667,529 flat strips or bands are used in combination with wires or cables to provide reinforcement for radial ply pneumatic tires. In U.S. Pat. No. 3,794,097 flat wires are provided with longitudinally extending grooves in order to enhance adhesion between the ribbon and the rubberized material.

SUMMARY OF THE INVENTION

The present invention provides a steel member having a carbon content ranging from about 0.4 percent to about 0.9 percent. essentially rectangular in cross-section, having a continuous adhesive coating on the surface thereof and characterized by a tensile strength greater than 200 ksi and a microstructure of tempered martensite, bainite and mixtures thereof.

The present invention relates to a method for making a pneumatic tire reinforcing member by continuously heat treating rectangular steel stock having an aspect ratio ($W/t$) greater than 2 so as to obtain a microstructure of tempered martensite, bainite or mixtures thereof and thereafter applying an adhesive coating to the stock. The product produced by the method of this invention is further characterized by a tensile strength in excess of 200 ksi.

The present invention allows light gauge coils, particularly black plate coils, wherein black plate is defined as, a product of the cold reduction method in gauges No. 29 and lighter (thicknesses less than 0.0141 inch) to be converted into ribbon-like tire reinforcing elements exhibiting high strength levels. This may be accomplished by increasing the carbon content of the coil stock to at least 0.40% by carburization, slitting the stock into a rectangular shape having an aspect ratio greater than 2, continuously heat treating the stock so as to obtain a microstructure of tempered martensite, bainite or mixtures thereof; and then applying an adhesive coating to the stock.

It is therefore an object of this invention to provide a steel reinforcing member characterized by a tensile strength greater than 200 ksi and a microstructure of tempered martensite, bainite or mixtures thereof.

Another object of this invention is to provide a reinforcing member essentially rectangular in cross-section.

A further object of this invention is to provide a reinforcing member that has enhanced adhesion to rubber.

A still further object of this invention is to provide a method wherein coil stock can be converted into a ribbon-like reinforcing member.

Another object of this invention is to provide a method wherein low carbon black plate can be converted into a high strength reinforcing member.

A further object of this invention is to provide a tire fabric containing a ribbon-like high strength reinforcing member.

Another object of this invention is to provide a pneumatic tire containing a ribbon-like high strength reinforcing member.

DETAILED DESCRIPTION OF THE PREFERRED EMBODIMENT

Figure 1:
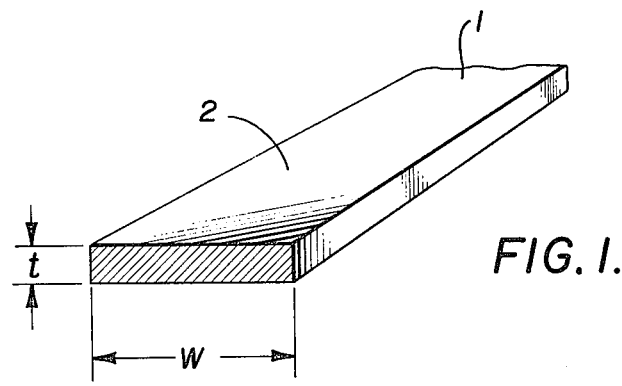
FIG. 1 is a perspective view of the reinforcing member of this invention.

In conducting the process of this invention steel in coil form, generally less than about 20 mils thickness is employed as the starting material. Two forms of coil stock may be used in practicing this invention. Once such form is black plate with an initial carbon content approximately 0.05 to 0.15 percent which is continuously carburized. The carburization process is similar to that disclosed in commonly assigned copending patent application Ser. No. 519,365 filed on Oct. 30, 1974 by D. I. Golland, et al. now U.S. Pat. No. 3,950,192, issued on Apr. 13, 1976. A second form of starting stock can be high carbon strip in compositions such as AISI C 1040 up to and including AISI C 1095.

After providing steel in coil form with the desired carbon content, the coil is slit into continuous lengths of ribbon. The cross-sectional dimensions of the slit product are critical to this invention as will hereinafter be more fully discussed.

To substitute ribbon for cord as a reinforcing member it must have the same strength level as the cord. As used herein strand is defined as an assembly of filaments and cord is defined as a twisted or formed structure composed of two or more strands. The use of these terms for the purposes of this description may be considered synonymous and therefore be used interchangeably. For example a typical cord construction employed in reinforcing pneumatic tires is a strand consisting of five filaments of 0.010 inch diameter twisted in one direction and commonly referred to as a 1 × 5 cord or strand. It was determined that a ribbon 0.010 inch thick by 0.040 inch wide exhibits approximately the same strength level as the 1 × 5 cord. Another way to express this concept of interchanging ribbon for cord is to match the cross-sectional areas of two reinforcing elements of like physical properties.

Generally speaking the ribbon of this invention should have an aspect ratio greater than 2 wherein this ratio is defined as ribbon width ($w$)/ribbon thickness ($t$). For satisfactory results $w$ is in the broad range of from 10 mils to 200 mils and $t$ is in the broad range of 5 mils to 20 mils.

The maximum width of the ribbon of this invention for use in pneumatic tires will be limited by fatigue failure resulting from high stresses when the high modulus ribbon is bent transversely as well as longitudinally. To achieve optimum fatigue life the width and thickness can be varied once a desired fatigue level has been obtained. For example if a specific fatigue life has been ascertained for a ribbon with certain dimensions, i.e., 0.010 inch × 0.040 inch, the thickness of this ribbon can be reduced while at the same time the width of the ribbon can be increased by a proportionate amount.

The width of the ribbon is also controlled by other factors that are associated with the construction of the belts or plies. To incorporate into the design of a tire a specific weight of steel reinforcing, the ends per inch (EPI) of the reinforcing member present in a belt or ply is a factor that must be considered. EPI is likewise controlled by the gap or (rivet) between adjacent ribbons. This latter parameter effects adhesion of the ribbon to the rubber. Since ribbon has characteristically large flat surfaces adhesion to the rubber is generally good. Taking advantage of this naturally good adhesion permits small rivets to be tolerated.

The slit ribbon is then heat treated in order to impart satisfactory mechanical properties to the reinforcing member. The ribbon, in coil form, is continuously passed into a furnace at a predetermined speed containing a protective or inert atmosphere and austenitized. After austenitization and homogenization the ribbon is quenched whereupon austenite transforms into martensite, bainite and/or mixtures thereof. The resulting transformation products are dependent upon the quench rate.

In the case of transformation to martensite the quenched ribbon is continuously tempered by heating the as quenched ribbon at a lower temperature, i.e., 200°–300° C. Tempering restores ductility and removes stresses imparted by quenching. The resultant microstructure is tempered martensite, bainite or mixtures thereof. The heat treated ribbon is rewound and ready for coating.

According to the method of this invention an adhesive coating is applied to the surface of the ribbon. Bonding steel to rubber can be accomplished by two different techniques which provide rubber compounders with some degree of latitude in the preparation of rubber compounds. One such technique is to plate the steel surface with brass for direct contact to the rubber. The other is to use a non-aqueous, i.e., organic rubber based adhesive, applied to the steel prior to contacting the steel with the rubber.

The reinforcing member of this invention, a steel ribbon 1 having a width $w$, a thickness $t$ and an adhesive coating 2 applied to the surface thereof, is shown in FIG. 1.

For the practice of this invention organic adhesive systems as well as brass-coated ribbon may be employed. Organic adhesive systems generally comprise solutions of organic polymers and dispersed solid compounds in organic solvents. The organic adhesives to be applied to the ribbon for adhesion to rubber are known.

Such known adhesive agents contain a film-forming polymer which is a halogenation product of a natural or synthetic rubber. Post-brominated poly-2,3-dichlorobutadienes or also postchlorinated poly-2,3-dichlorobutadienes or poly-2,3-dimethylbutadiene or chlorination or bromination products of nitrile rubbers, polybutadiene-styrene or rubber-like ethylene-propyleneterpolymer may be used with good results.

Frequently, such adhesive agents contain also nitroso compounds, such as dinitrosobenzene, p-dinitrosodiphenylamine, p-dinitrosocymene, dinitrosonaphthalene, methoxy-dinitrosobenzene, chloro-dinitrosobenzene, cyclohexyldinitrosobenzene.

Further known adhesives, which may be included in the adhesive especially for rubber to metal contain reactive synthetic resins, for example, epoxy resins, such as the reaction products of novolak with epichlorohydrin, or also phenolic resins or polysiloxane compounds containing unsaturated radicals. It is mostly advisable to add to such reactive synthetic resins so-called hardeners or cross-linking agents. For compounds containing epoxy groups, aliphatic or aromatic amines, acid amides with free amino groups, carboxylic acid anhydrides such as hexahydrophthalic anhydride or so-called Lewis acids or their complex compounds, e.g. the borontrifluoride complexes with amines or alkanols, can be used.

Also as adhesives for rubber to metal which may be included in the said adhesive are monomeric unsaturated silanes such as vinyltriethoxysilane or silanes containing amino groups such as aminopropyltriethoxypropylsilane or aminobutylmethyldiethoxysilane, or also mercaptosilanes.

Moreover, it is often appropriate to use adhesives for rubber to metal which comprise chlorinated diene polymers, epoxidized novolak made by the reaction of novolak with epichlorohydrin under alkaline conditions and so-called hardeners for epoxy resins.

Furthermore, with good results adhesives may be used, which comprise mixtures of chlorinated or hydrochlorinated dienic polymers, polychloroprene, and copolymers of vinyl pyridine with butadiene and styrene, or which also contain copolymers of conjugated dienes and alkanol esters of acrylic or methacrylic acid. Organic hydrocarbons, chlorinated hydrocarbons or also ketones, esters, ethers or also alcohols may be used as solvents, or dispersing agents respectively. Thus, for example, hexane, heptane, octane, toluene, benzene, xylene, methanol, ethanol, isopropanol, methylene chloride, carbon tetrachloride, dichloroethylene, chlorobenzene, dichlorobenzene, bromobenzene, acetone, methylethylketone, diethylketone, butyl acetate, amyl acetate, ethyl acetate, anisole and others may be used as solvents. Frequently, it is advisable to add to the solutions or the dispersions additional auxiliaries such as carbon blacks, aging inhibitors, pigments or dyes.

Metal filaments can also be bonded to rubber by treating the metal with a mixture of an aqueous dispersion of an elastomer and the constituents necessary to form a phenolformaldehyde resin.

The aqueous dispersion of elastomer may be any one of a variety of rubber latices and may, if desired, be a mixture of two or more latices. Examples of suitable latices include those of natural rubber, styrene/butadiene/vinyl pyridine, carboxylated styrene/butadiene which is preferably a terpolymer of styrene/butadiene and an unsaturated dicarboxylic acid such as itaconic acid or fumaric acid, copolymers of conjugated diene monomers and acrylonitrile, copolymers of conjugated diene monomers and an unsaturated ketone in which the copolymer contains from 0.2 percent to 10 percent by weight of the unsaturated ketone, and terpolymers of a conjugated diene, styrene and an unsaturated ketone. A particularly preferred latex is styrene/butadiene/vinyl pyridine latex with a weight ratio of 15:70:15.

The constituents necessary to form the phenolformaldehyde resin may suitably be resorcinol and formaldehyde. The molar ratio of resorcino: formaldehyde may suitably be from 1:1 to 1:3. The constituents of the phenolformaldehyde - forming resin may be incorporated into the adhesion promoting mixture in any of the known manners. Where these constituents are resorcinol and formaldehyde the latter may be added for example as an aqueous solution. The phenol may alternatively be, for example, m - amino phenol, or naphthols such as 1,5 - dihydroxynaphthalene or 1,3 - dihydroxynaphthalene.

Aside from phenol - formaldehyde other constituents may be added to the elastomer or latex such as for instance an isocyanate, an epoxy and a resorcinol - formaldehyde.

Other organic adhesives are disclosed in U.S. Pat. Nos. 3,817,778 and 3,835,082 wherein the RFL systems are modified. For example, a composition comprising a resorcinol formaldehyde condensation product and a butadiene - styrene, vinylpyridine latex, called RFL is commonly used to bond fibers to rubbers. These two patents disclose that the unsaturate - resorcinol polymer resins may advantageously replace the resorcinol in the RFL system to secure improved adhesion. For instance a steel ribbon would be coated with the following organic adhesive system, the aldehyde condensate of a mixture of resorcinol and water soluble essentially saturated polymer. This mixture results from introducing olefinic unsaturated radical of 3–10 carbon atoms into the resorcinol nucleus within the range of about 0.1 to 0.6 mole of unsaturated radical per mole of resorcinol charged, the aldehyde being selected from the group consisting of saturated aliphatic aldehydes having straight or branched chains of 1 to 6 carbon atoms, paraformaldehyde and paraldehyde in an amount in the range of about 0.2 to about 0.7 mole percent of resorcinol charged in making the mixture.

The unsaturated radical is derived from an unsaturate selected from the group consisting of (1) halo-olefin, (2) dihalo-olefin, (3) acrylic diolefin and (4) olefinic alcohol or olefinic alcohol precursor.

Furthermore the aldehyde can be formaldehyde and the unsaturated radical can be derived from an unsaturate selected from the group consisting of 3-chloropropene, 1,4-dichloro-2-butene, 2,3-dichloropropene, 3,4-dichloro-1-butene, 5,7-dimethyl-1,6-octadiene, 1,3-pentadiene and 1,5-cyclooctadiene.

The product obtained by this invention exhibits excellent mechanical properties. The following properties are considered typical:

| | |
|---|---|
| Ultimate Tensile Strength | 340 Ksi |
| Yield Strength | 270 Ksi |
| Elongation | 3.0 to 3.3% |

In a similar manner rubber adhesion tests have shown the product has excellent adhesion to rubber.

Figure 2:
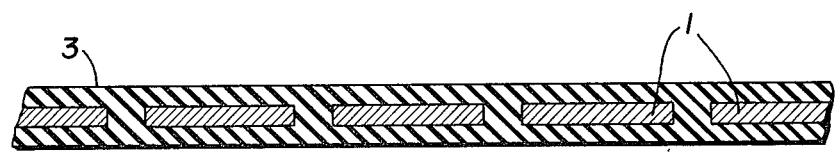
FIG. 2 is a cross-sectional view showing the reinforcing members of FIG. 1 contained in rubber stock.

Another embodiment of this invention is shown in FIG. 2 and comprises a rubber stock fabric 3 containing a plurality of ribbons 2 placed in side-by-side relation. A plurality of adhesive coated ribbons are placed onto green unvulcanized rubber in a predetermined geometric pattern that is controlled by the rivet or gap between adjacent ribbons and the number of ends per inch of the ribbon.

A still further embodiment of this invention is a bias belt cut from such fabric. After the fabric is prepared it is cut on a bias thereby providing narrow layers of bias belt stock for reinforcing pneumatic tires in the area under the tread in the crown of the tire.

Figure 3:
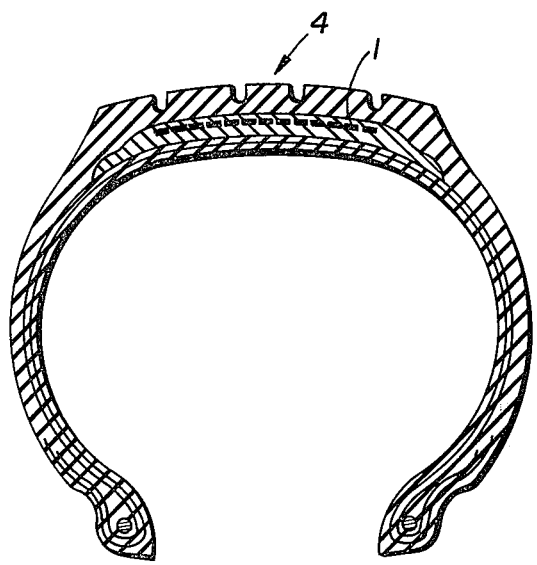
FIG. 3 is a diagrammatic transverse section partially cut away of a tire showing the reinforcing members positioned therein.

A further embodiment of this invention is a tire 4 shown in FIG. 3 containing the heretofore described belts having the steel ribbons 1 positioned therein At least two such belts are assembled so that the ribbons in each belt are disposed at angles of approximately 15° to 30° to the midcircumferential plane of the tire but in an opposite sense to each other. The belts are placed onto a toroidally expanded unvulcanized casing or carcass. This assembly is then expanded, tread portion applied and placed into a tire curing press. A completed tire is thereafter removed.

It has been determined that steel ribbon of this invention with an ultimate tensile strength in excess of 300 ksi exhibits exceptionally good performance in pneumatic tires.

The slit ribbon has a pair of roughened surfaces. These are the surfaces which define the thickness of the ribbon that fractured during slitting as the coil stock passed through the slitting apparatus. It is believed that these roughened fracture surfaces enhance bonding of the ribbon to rubber even after the ribbon has been coated with an adhesive.

The invention can now be understood more clearly by reference to the following examples:

EXAMPLE I a. Starting material — C1008 black plate, 0.010 inch thick × 24 inches wide, carbon content approximately 0.08%.

b. Black plate coil was carburized to C1060 at 1800° F in an atmosphere of 10% methane and 90% endothermic gas and slow cooled, carbon content approximately 0.60%.

c. Carburized coil was rough slit into 1 inch multiples, reaustenitized at 1920° F and quenched to a microstructure of fine pearlite.

d. 1 inch multiples were slit into ribbons 0.040 inch wide. Ribbon cross-section 0.010 inch × 0.040 inch e. Heat treating Run No. R-30. Ribbon austenitized at 730° C, ribbon speed through furnace 135–140 feet per minute, quenched in 80° C water and tempered at 260° C for approximately 40 seconds.

Microstructure — tempered martensite
Mechanical properties

| | |
|---|---|
| Ultimate Tensile Strength | 330 to 338 Ksi |

-continued

| | |
|---|---|
| Yield Strength | 273 to 287 Ksi |
| % Elongation | 3.0 to 3.3 | f. The heat treated ribbon was cleaned, rinsed in water and treated in the manner described in U.S. Pat. No. 3,817,778 wherein the ribbon is dipped in the adhesive composition and thereafter cured. Standard H-block and strip adhesion tests performed essentially in the manner described in U.S. Pat. No. 3,817,778 resulted in the following values.

| | | Adhesion Test Results | |
|---|---|---|---|
| | | Strip Adhesion | |
| Sample No. | H-Block Force (KG) | Visual | Pulls lbs. |
| P-1-1 | 16 | 5.0 | 54 |
| P-1-2 | 21 | 5.0 | 65 |
| P-1-4 | 22 | 5.0 | 54 |
| P-1-5 | 17 | 5.0 | 72 | g. A fabric was prepared using the coated ribbon by drum winding the ribbon onto green-unvulcanized rubber stock, after which a layer of similar rubber stock was cured thereon. 18 ends-per-inch were placed in side-by-side relation into the stock. Belts were then obtained by cutting the fabric on a bias. Two belts were then placed onto a toroidally expanded unvulcanized casing and a tire was thereafter obtained. The angle formed by the ribbon was approximately 24° to the midcircumferential plane of the tire.

Six JR 78-15 radial tires were constructed in this manner and thereafter tested.

A wear and durability test was performed on these tires consisting of a road test at 60 miles per hour on an oval track. Results are as follows:

| Tire No. | Tread Wear | Durability |
|---|---|---|
| 448 | Exceptionally good | 44,100 acceptable |

Remarks — test stopped because of a large separation in the tire side wall. This failure is not related to the reinforced belts.

| | | |
|---|---|---|
| 450 | Exceptionally good | 45,000 acceptable |
| 452 | Exceptionally good | 45,000 acceptable |
| 453 | Exceptionally good | 45,000 acceptable |

Remarks — Tires 450, 452 and 453 were stopped deliberately and the treads were cut off to permit recapping. These tires were not recapped because of a very slight belt edge separation. Tire 449 — dynamic plunger test, penetration 3½ inches, force 2,040 lbs. and energy 4,200 lbs. — acceptable results. Tire 451 — DOT extended high speed endurance — tire ran 30 minutes at 100 miles per hour — more than acceptable results.

EXAMPLE II

Steps a – d same as Example I.

e. Heat treating Run No. R-38. Ribbon austenitized at 735° C; ribbon speed through furnace 138–140 feet per minute, quenched in 80° C water and tempered at 280° C for approximately 40 seconds.

Microstructure — tempered martensite

Mechanical properties

| | |
|---|---|
| Ultimate Tensile Strength | 340 Ksi |
| Yield Strength | 291 Ksi |
| % Elongation | 3.2 | f. The heat treated ribbon was cleaned, rinsed in water and treated with an organic adhesive as described in Example I. The adhesion values are as follows:

| | | Adhesion Test Results | |
|---|---|---|---|
| | | Strip Adhesion | |
| Sample No. | H-Block Force (KG) | Visual | Pulls lbs. |
| P-2-1 | 15 | 4.5 | 51 |
| P-2-2 | 15 | 4.9 | 50 | g. Five JR 78-15 radial tires were constructed in the manner set forth in Example I. Four of these tires were tested on a cobblestone track.

Track test results are as follows:

| Tire No. | Test Results |
|---|---|
| 509 | 5,000 laps |
| 510 | 3,600 laps |
| 511 | 12,000 laps |
| 512 | 9,070 laps |

Criteria for acceptance — less than 20 cord breaks after 8,000-10,000 laps for steel belted tires.

Although the invention has been illustrated by the heretofore examples, it is not limited thereto. Changes and modifications of the examples of the invention can be made which do not constitute departure from the spirit and scope of the invention.

The invention for which an exclusive property or privilege is claimed are defined as follows:

I claim:

1. An article of manufacture suitable for reinforcing a rubber composite structure wherein said article comprises a steel ribbon having a carbon content ranging from about 0.4% to about 0.9% and a continuous coating of an adhesive for rubber on the surface thereof, said ribbon having a width in the range of 10 to 200 mils and a thickness in the range of 5 to 20 mils and an aspect ratio of greater than about 2, said ribbon being further characterized by an ultimate tensile strength greater than about 200 KSI and a heat treated and quenched microstructure of tempered martensite, bainite or mixtures thereof.

2. The article of claim 1 wherein said ribbon has a brass coating on its surface.

3. The article of claim 1 wherein said ribbon has a resorcinol-formaldehyde-latex coating applied to its surface.

4. The article of claim 1 wherein said ribbon has an ultimate tensile strength greater than 300 KSI.

5. The article of claim 1 wherein said ribbon has a microstructure of tempered martensite.

6. An assembly for reinforcing tires comprising, an elastomeric body having a plurality of substantially rectangular steel ribbons adhesively bonded therein, said ribbons having a width in the range of 10 to 200 mils and a thickness in the range of 5 to 20 mils and an aspect ratio of greater than about 2 and being spaced in side-by-side relationship and being substantially parallel to each other and said ribbons being characterized by a tensile strength greater than 200 KSI, a carbon content ranging from about 0.4% to about 0.9% and a heat treated and quenched microstructure of tempered martensite, bainite or mixtures thereof.

7. A pneumatic tire comprising a plurality of essentially rectangular steel reinforcing ribbons having a width in the range of 10 to 200 mils and a thickness in the range of 5 to 90 mils and an aspect ratio of at least 2 and being adhesively bonded therein along at least one plane wherein said ribbons are in parallel side-by-side relationship, said ribbons having an ultimate tensile strength of at least 200 KSI, a carbon content ranging from about 0.4% to about 0.9% and a heat treated and quenched microstructure of tempered martensite, bainite or mixtures thereof.

* * * * *

Disclaimer 4,011,899.—*John M. Chamberlin*, St. Louis, Mo. STEEL MEMBER FOR REINFORCING RUBBER COMPOSITIONS AND METHOD OF MAKING SAME. Patent dated Mar. 15, 1977. Disclaimer filed Feb. 24, 1977, by the assignee, *Monsanto Company*.

The term of this patent subsequent to Apr. 27, 1993, has been disclaimed.

[*Official Gazette April 19, 1977.*]